June 3, 1969 J. R. WIEGAND 3,448,440

INTERCEPTOR TRANSFORMER PROXIMITY KEY

Filed Dec. 17, 1965

Sheet 1 of 3

INVENTOR

John R. Wiegand

BY

Polachek & Saulsbury

ATTORNEYS

INVENTOR
John R. Wiegand
BY
Polachek & Saulsbury
ATTORNEYS

INVENTOR

John R. Wiegand

BY

Polachek & Saulsbury

ATTORNEYS

United States Patent Office 3,448,440

Patented June 3, 1969

3,448,440

INTERCEPTOR TRANSFORMER PROXIMITY KEY

John R. Wiegand, Valley Stream, N.Y., assignor to Wiegand Electronics Co., Inc., Union County, N.J., a corporation of New Jersey Filed Dec. 17, 1965, Ser. No. 514,555
Int. Cl. G11b *5/00, 5/20*
U.S. Cl. 340—174 10 Claims According to the invention, a proximity key embodying the invention may be in the form of a flat card on which is a thin interceptor transformer. The interceptor transformer will be in general similar in character to one of those described in my prior Patent 3,137,842 and in my copending patent application 356,724 filed Apr. 2, 1964, now Patent No. 3,223,987. The interceptor transformer comprises a flat spiral coil made of copper wire. Around the wire are two helices of enameled magnetic wire uniformly wound in opposite directions for the entire length of the spiral coil. A capacitor is connected across the ends of the spiral coil. The device is intended for use with a transmitting station which emits binary coded damped pulse trains of magnetic waves. The pulse trains reaching the proximity key will be memorized or stored therein, and will be reradiated as magnetic pulses from the proximity key to the transmitting station where the returning magnetic pulses will actuate a relay, switch or other circuit thereat.

For systems in which the transmitting station is located remotely from proximity key so that reradiated magnetic waves or pulses will not reach the transmitting station with sufficient amplitude, the proximity key can employ cooperation interceptor transformers electrically interconnected with an amplifier for amplifying the incoming damped pulse train and outgoing answers, so that a "closed circuit" is established between proximity key and remote station.

The invention can be used for proximity key cards which can be carried by a person in a pocket or handbag. When the person carrying the card approaches a locked door having an associated transmitter emitting coded magnetic waves, the door will be automatically opened by an electronically controlled door opener triggered by waves reradiated from the proximity key card carried by the approaching person.

The invention can be used in a bank, defense manufacturing plant or other installation where various persons have authorized access to only certain parts of the installation. A person carrying a particularly proximity key which may be part of an identification badge will find that as he approaches locked doors and gates, only those doors and gates will open to him to which he has authorized access, and all other doors and gates will remain closed.

The invention can be used for opening garage doors automatically.

The door will open automatically when a driver carrying a particular proximity key card corresponding to the coding of the garage door control, approaches the door while inside or outside his vehicle.

The invention can be used by tenants of a building, each of whom carries a proximity key corresponding to coding of a door to the building. As a tenant carrying a proximity key arrives at or approaches the door the door will automatically open.

A further application of the invention is used in an automatic trail system. For example, identical proximity keys can be deposited in a sea at intervals along a shipping lane. Boats traversing this lane can follow the lane by use of an automatic pilot. This capability is made possible by the fact that each proximity key emits a magnetic signal in its own particular code only when magnetic waves from a nearby radiant energy source interrogate the proximity key and supply the energy required for reradiation by the proximity key of predetermined coded answers.

It is therefore a principal object of the invention to provide a magnetic proximity key device employing a tuned resonant circuit including an interceptor transformer and capacitor connected across the transformer.

A further object is to provide a proximity key device employing a plurality of interceptors transformers electrically interconnected with an amplifier, one of the transformers being part of a tuned circuit.

Another object is to provide a magnetic signal system including a transceiver station for emitting coded magnetic waves, and one or more proximity keys each comprising a resonant circuit including an interceptor transformer responsive to coded waves received at a point spaced from the transceiver for reradiating coded pulses corresponding to the received coded waves, to actuate a receiving circuit at the transceiver.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Figure 1:
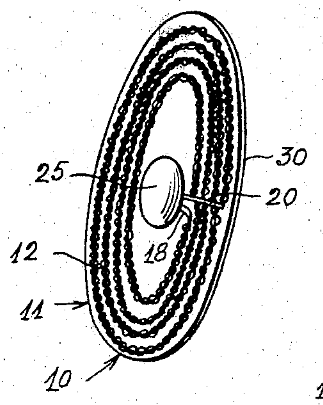
FIGURE 1 is an oblique perspective view of a magnetic proximity key card embodying the invention.
Figure 2:
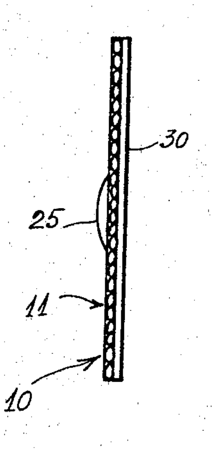
FIG. 2 is an edgewise elevational view of the proximity key card.
Figure 3:
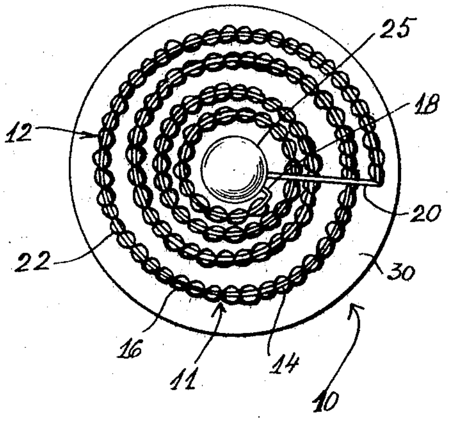
FIG. 3 is a side elevational view of the proximity key card.

Referring first to FIGS. 1–3, 5 there is shown a proximity key card 10 comprising interceptor transformer 11. This transformer has a flat spiral coil 12 of highly conductive insulated wire 14 such as copper wire. Helically wound in one direction around the wire 14 is a first winding 16 made of thin enameled magnetic wire 16. The winding has uniformly spaced turns extending between inner and outer ends 18, 20 of the coil 12. Helically wound around the wire 14 of coil 12 is a second winding 22 of thin enameled magnetic wire. This winding is wound uniformly in a direction opposite to that of winding 16 from end to end of coil 12 so that the turns of two helical magnetic windings 16, 22 windings intersect each other regularly each half turns at points P on opposite sides of wire 14; see FIG. 4. This equalizes magnetic flux in coil 12 in both directions. The pitch of both windings 16, 22 is the same. Coil 12 and windings 16, 22 constitute an interceptor transformer.

The coil 12 has a "pancake" form with a central space in which is disposed a circular capacitor 25. Opposite ends 18, 20 of the coil 12 are insulated by enamel and are directly connected to capacitor 25 as shown in FIGS.

Figures 4, 5, 6, 7:
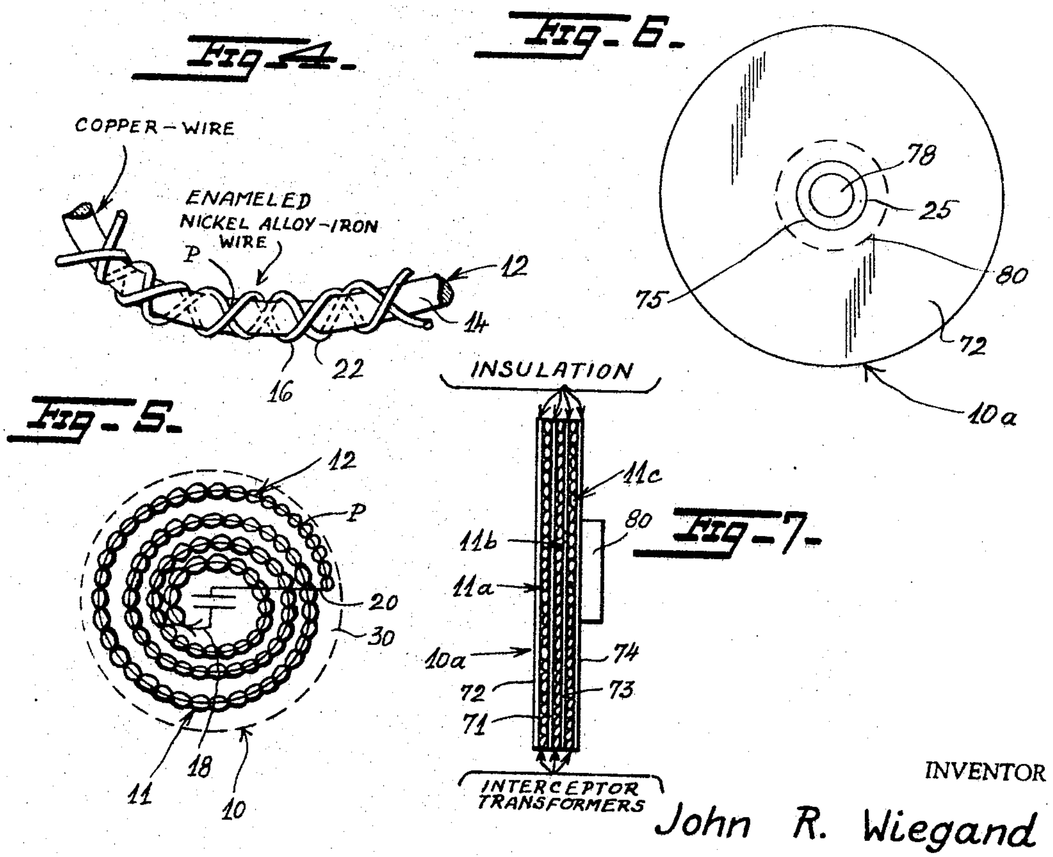
FIG. 4 is an enlarged fragmentary side view of a portion of an interceptor transformer such as used in the proximity key card of FIGS. 1–3.
FIG. 5 is a schematic diagram of the circuit of the proximity key card.
FIG. 6 is a side view of another proximity key card.
FIG. 7 is an edgewise elevationary view of the proximity key card of FIG. 6.

1, 3 and as shown schematically in FIG. 5. The coil 12 and capacitor 25 constitute a tuned resonant circuit which has a fundamental resonant frequency depending on the number and spacing of turns of coil 12, the size of wire 14, and the size of capacitor 25. The copper wire may range from #34 gauge to #26 gauge. The magnetic wire may range from 0.0003 inch to 0.001 inch in diameter. The pitch of the turns of each of the windings 16, 22 may range from three times the diameter of wire 14 to twenty times the diameter of wire 14. The number of turns of coil 12 and the size of capacitor 25 will depend on the resonant frequency desired. The windings 16 and 22 may be made of 52% nickel or nickel alloy and 48% iron. The windings 16, 22 may be made of a single length of wire.

A thin plastic or fiber insulation disk 30 may serve as a form or support for the interceptor transformer defined by coil 12 and windings 16, 22. The assembly of capacitor and interceptor transformer may be cemented to one side of disk 30. This forms a dimensionally stable structure which can be used for the purposes of the invention. The assembly may have a total thickness of about one eighth of an inch.

Figures 8, 9, 10, 12:
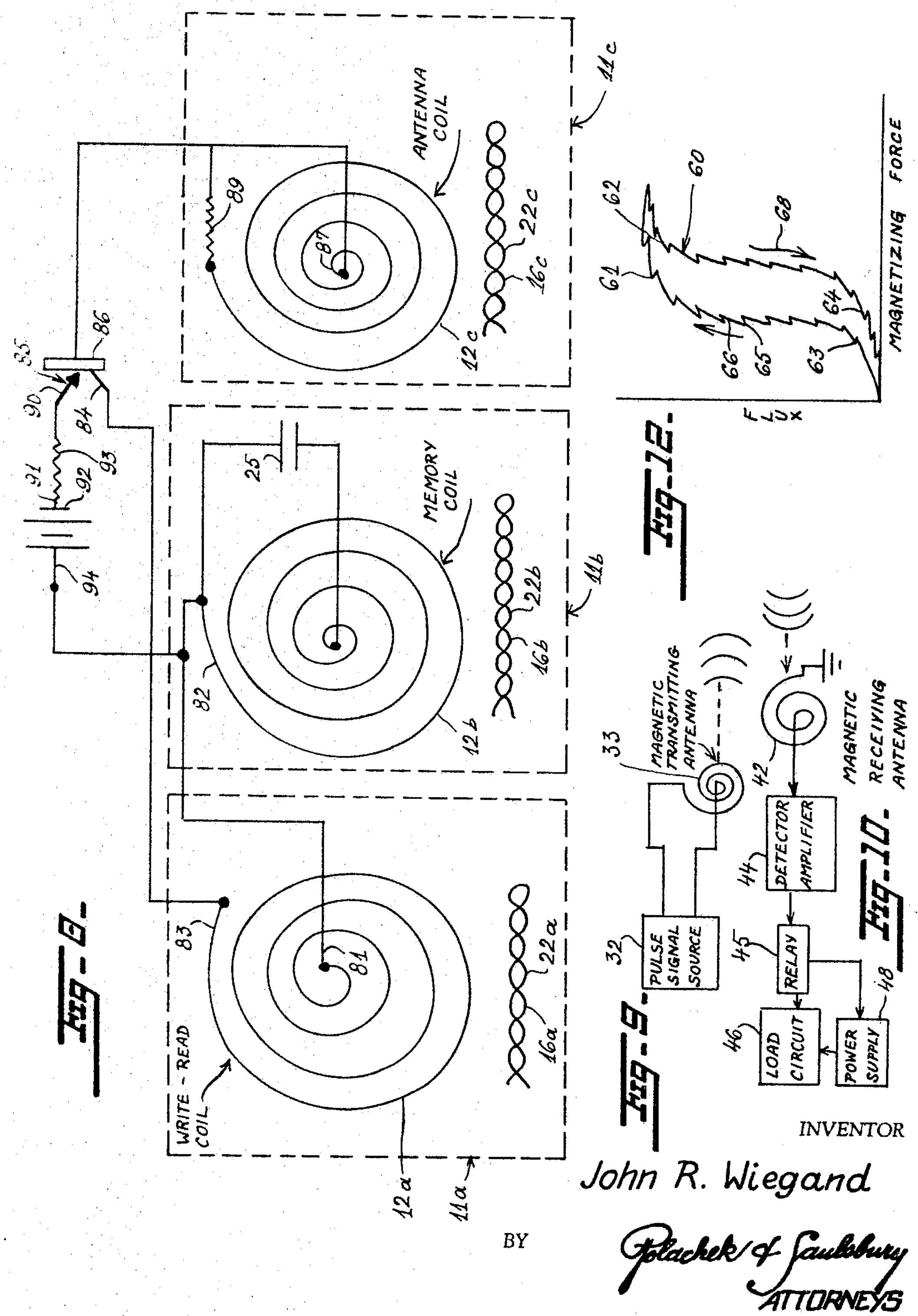
FIG. 8 is a schematic diagram of the circuit of the proximity key card of FIGS. 6, 7.
FIG. 9 is a block diagram of a magnetic wave transmitter.
FIG. 10 is a block diagram of a magnetic wave receiver.
FIG. 12 is a hysteresis diagram used in explaining the invention.

FIG. 9 shows diagrammatically a typical transmitter which may form part of a transceiver station used in conjunction with proximity key 10. This transmitter has a pulse signal source 32 which drives a magnetic antenna 33 to emit trains of damped binary magnetic pulses whose oscillographic configuration is shown graphically by wave trains 35 in FIG. 11. The binary pulses reach the proximity key 10 which will be spaced a short distance away in the magnetic field of antenna 33. The first half 36 of first pulse of maximum amplitude of each pulse train which arrives at the proximity key will erase all binary magnetic states representing any previously memorized binary pulses.

It can be seen that the time used in writing into the proximity key is much more than the time used to erase it. This ratio can be hundreds of time. Therefore, the frequency used in writing can be returned in pulses of much higher frequency which therefore can be detected over the writing frequency.

The magnetic cores or windings 16, 22 assume a changing magnetic state in response to the received gradually decaying or damped magnetic wave trains 35.

Figure 11:
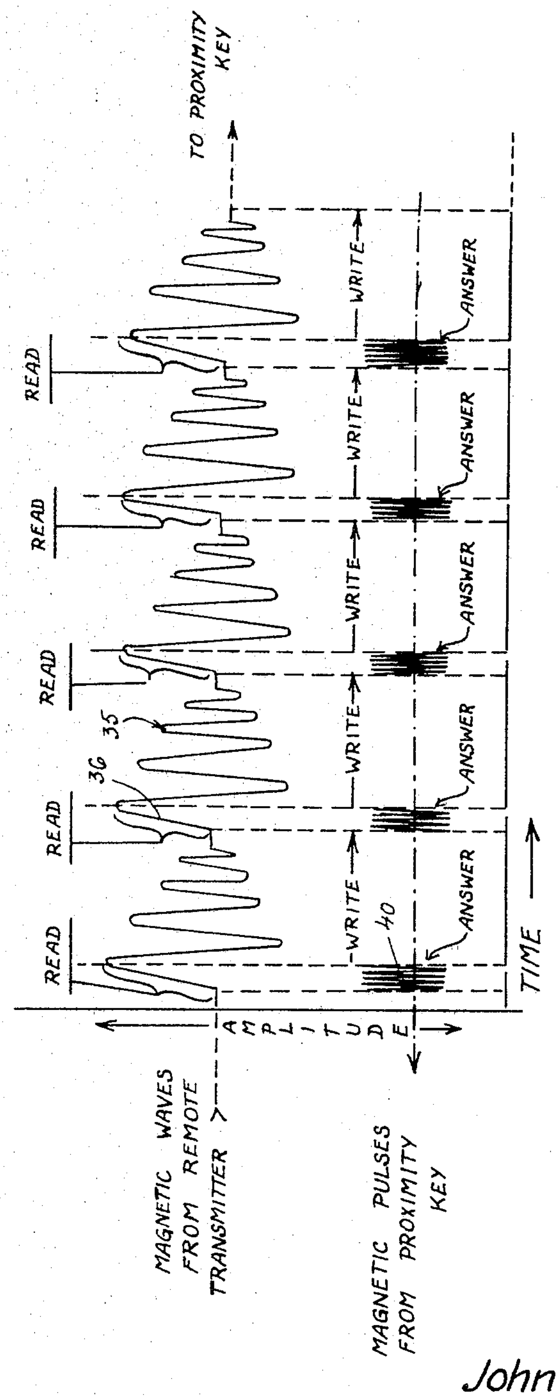
FIG. 11 is a pulse diagram used in explaining the operation of the invention.

Answer pulses 40 of the proximity key indicated in FIG. 11 are reradiated magnetic waves. These waves are picked up by a magnetic antenna 42 of a receiver shown diagrammatically in FIG. 10. The antenna 42 drives a detector-amplifier 44 which applies amplified pulses to a relay 45. The relay controls actuation of a load circuit 46 in any desired way, such as by controlling application of power to the load circuit from power supply 48. The detector-amplifier will be designed so that it is operative to receive answer pulses 40 from the proximity key only during the first quarter cycle 36 of each cycle of wave transmission. The damped wave trains are magnetically recorded at the proximity key during the WRITE portion of each wave train. The answer pulses 40 are emitted during each subsequent READ quarter cycle 36 and represent the "memorized" preceding written in damped pulse train 35.

It will be apparent from an inspection of FIG. 11 that the timing and duration of the answers 40 of the proximity key will depend on the amplitude, frequency and time duration of the pulse trains 35 received. The proximity key normally consumes no energy. It is a passive circuit and only oscillates in response to excitation by the received magnetic wave trains. Obviously a proximity key which is designed to respond at a particular frequency to a particular coded wave train will not respond to a wave train having different frequency. Thus relay 48 will not be triggered by the presence of a proximity key having a resonant frequency different from the one prescribed for the detector-amplifier 44 at that receiving station.

Furthermore, all proximity keys 10 having the correct coding frequency will respond to the pulse trains emitted by a particular transmitter and will not respond to pulse trains 35 emitted by a transmitter having different frequency. It is this characteristic which makes it possible to use the device in an interrogation system where a locked device is unlocked only in response to correct answers received from an interrogated magnetic proximity key, in other words—a closed circuit.

The unique memorizing characteristics of the interceptor transformer as is known from my prior Patents 3,137,842 and 3,223,987 above mentioned, is due to various levels of retentive magnetism at different times which requires different energy levels to reverse its polarity. This nonlinearity in magnetization characteristic is due to the inhomogeneous crystalline mixture of nickel or nickel alloy and iron in the wire of windings 16 and 22. Since the wire is very thin and has been repeatedly drawn through dies and annealed, the inhomogeneity in crystalline structure is very pronounced, so that magnetization of the magnetic windings 16, 22 does not take place uniformly and linearly, but in discrete steps and in a nonlinear manner. FIG. 12 shows a typical hysteresis curve 60 of magnetic wire having the characteristics above mentioned. Note that the curve deviates materially from an ideal rectangle at the knees 61, 62 and bends 63, 64. Also note the irregularities 65 in the magnetization rise 66 and demagnetization reversal 68.

FIGS. 6 and 7 show another proximity key card **10*a* which is intended for use where the proximity key card 10 cannot be used because it cannot come close enough to the transmitter and/or receiver of a transceiver station to receive magnetic waves of sufficient amplitude or to retransmit magnetic waves of sufficient amplitude. Card 10*a* has a laminated structure with three interceptor transformers 11*a*, 11*b* and 11*c* each of which is substantially identical in structure to transformer 11 of card 10. Thin insulated disks 73, 71 are disposed between the abutted interceptor transformers and two additional disks 72, 74 are applied to the outer sides of the assembly. The transformers are cemented to the disks to form a unitary flat pancake structure. The disks have registering central holes 75 in which is capacitor 25 and a transistor 78 adjacent to the capacitor. A battery and resistor assembly 80 is applied to one side of the card 10*a* at holes 75**.

FIG. 8 shows the circuitry of proximity key card **10*a*. The three interceptor transformers 11*a*, 11*b*, 11*c* have copper wire coils 12*a*, 12*b* and 12*c* are electrically interconnected. The inner end 81 of coil 12*a* is connected to the outer end 82 of coil 12*b*. The outer end 83 of coil 12*a* is connected to collector 84 of transistor 85. This transistor may be a 2N1184 or similar type. The base 86 of the transistor is connected to the inner end 87 of coil 12*c*. The outer end 88 of coil 12*c* is connected to the inner end 87 via a resistor 89. Transformer 11*c* serves as an antenna for both receiving and reradiating magnetic waves. Crossed enameled helical magnetic wire windings 16*a*, 22*a*, 16*b*, 22*b* and 16*c*, 22*c* are wound around the wire of coils 12*a*, 12*b*, 12*c***, respectively.

Capacitor 25 is connected across opposite ends of coil **12*b* in interceptor transformer 11*b*. This transformer acts as a memory device. The transformer 11*a* serves to wire pulses into the assembly and to read pulses out of the assembly. Transistor 85 serves as an amplifier for received and reradiated pulses. This transistor has emitter 90 connected to negative terminal 91 of battery 92. Battery 92 may be a small mercury type of battery. The positive terminal 94 of the battery is connected to the inner end 81 of coil 12*a* and outer end 82 of coil 12*b*. A bias resistor 93 is connected in series with emitter 90**.

FIG. 11 may be taken as illustrating the basic mode of operation of the proximity key **10*a*. Suppose alternating current at 60 cycles per second is available at the pulse signal source 32 of the transmitter shown in FIG. 9, and that the magnetic antenna 33 sends out damped magnetic waves 35 in groups of twenty pulses, three groups per second. These damped waves will be detected and amplified by the transistor amplifier circuit of FIG. 11. The first quarter cycle 36 of each wave train 35 received occupies 1/240 of a second. This quarter cycle pulse has the greatest amplitude of the pulse train and it erases any previously memorized magnetic state in all interceptor transformers. Magnetic wave spurts of approximately 20 cycles occur during each answer pulse 40 lasting 1/240 of a second. This is equivalent to a frequency of 4,800 cycles per second. The detector-amplifier 44 at the receiver will be tuned to this frequency and will detect it for operating the load circuit 46. If the proximity key 10***a* is in a vehicle approaching a garage door controlled by load circuit 46, the presence of the key will actuate circuit 46 from a considerable distance, greater than would be possible with proximity key 10 which has no associated amplifier.

It will be understood in the example just given, that the detector-amplifier will be pulsed to receive at magnetic waves 4,800 cycles per second only three times per second during the 1/240 of a second when the proximity key is designed to reradiate all frequencies. Thus the receiver operates in coordination with the proximity key and cannot be affected by spurious signals of any frequency or by magnetic signals of 4,800 cycles per second which arrive at a rate other than three times per second during the 1/240 of a second intervals when the detector-amplifier is open to receive.

There has thus been provided according to the invention, in a small compact, inexpensive structure, a device which is responsive to interrogation by magnetic waves to respond magnetically. The device in its simplest form has no associated power supply and takes its energy from magnetic waves which it receives, memorizes and then reradiates. The damped wave trains which it memorizes it reradiates in short pulses at the start of each new wave train. When used in coordination with a properly designed transmitter and receiver it can serve as part of a coded security system. The operating range of a proximity key can be increased by providing it with an amplifier.

While I have illustrated and described the preferred embodiments of my invention, it is to be understood that I do not limit myself to the precise constructions herein disclosed and that various changes and modifications may be made within the scope of the invention as defined in the appended claims. Also the frequency used in writing may be as high as 500 kc. and higher.

What is claimed is:

1. A magnetic proximity key comprising a flat spiral coil of electrically conductive wire, a first magnetic wire winding wound uniformly in one direction helically around the electrically conductive wire from end to end thereof and insulated electrically from the coil, a second magnetic wire winding wound uniformly in an opposite direction helically around the electrically conductive wire of the coil and around the first magnetic wire winding, said second winding being electrically insulated from the coil and first winding, each turn of the second winding intersecting a turn of the first winding, said coil and windings constituting an interceptor transformer magnetically balanced by the two windings, and a capacitor connected across inner and outer ends of said spiral coil to constitute a tuned resonant circuit with said coil, whereby damped magnetic wave trains arriving at said circuit are magnetically memorized by said interceptor transformer during a major portion of each wave train, and magnetic pulses representing the memorized wave trains are reradicated magnetically from said interceptor transformer during a portion of each initial one half cycle of each successive wave train, the reradiated magnetic pulses having a frequency corresponding to the resonant frequency of the tuned circuit.

2. A magnetic proximity key as recited in claim 1, wherein the magnetic wire of the first and second windings is composed of a mixture of metals including iron, said mixture having an inhomogeneous crystalline structure so that the magnetic wire has an irregular, nonrectangular magnetization hysteresis characteristic.

3. A magnetic proximity key as recited in claim 1, further comprising a thin insulation disk at one side of said transformer and capacitor supporting the same, with said capacitor being disk-like in form and located centrally within said coil and windings in the plane thereof.

4. A magnetic proximity key as recited in claim 1, further comprising a second and third interceptor transformers, said second interceptor transformer having a second flat spiral coil of electrically conductive wire, and two other windings of magnetic wire wound in opposite directions around the wire of the second spiral coil and electrically insulated therefrom; said third interceptor transformer having a third flat spiral coil of electrically conductive wire, two further windings of magnetic wire wound in opposite directions around the wire of the third coil; and circuit means interconnecting the three coils and capacitor; whereby the damped magnetic wave trains are picked up by the third interceptor transformer and the reradiated magnetic pulses are radiated by the third interceptor transformer; whereby the coil of the second interceptor transformer magnetically writes received magnetic wave trains into the first interceptor transformer for memorization thereby and reads magnetically memorized pulses out of the first interceptor transformer for reradiation by the third interceptor transformer.

5. A magnetic proximity key as recited in claim 4, further comprising a transistor amplifier having a base emitter and collector connected electrically in circuit with the three coils and capacitor for amplifying the received wave trains and the reradiated magnetic pulses.

6. A magnetic proximity key as recited in claim 4 wherein the three interceptor transformers are disposed side by side, and an insulation member disposed between each pair of transformers and secured thereto so that the three transformers constitute a flat pancake structure.

7. A magnetic proximity key as recited in claim 5, wherein the three interceptor transformers are disposed side by side, and an insulation member disposed between each pair of transformers and secured thereto so that the three transformers constitute a flat pancake structure, said disks having registering central holes, said capacitor and said transistor amplifier being located in said central holes to form a compact assembly.

8. A magnetic proximity key as recited in claim 5, further comprising a battery connected in circuit with the transistor for energizing the same.

9. A magnetic proximity key as recited in claim 5, wherein the magnetic wire of each winding of the three transformers is composed of a mixture of metals including iron, said mixture having an inhomogeneous crystalline structure so that the magnetic wire has an irregular nonrectangular magnetization hysteresis characteristic.

10. A magnetic proximity key as recited in claim 1, wherein the pitch of the turns of each magnetic wire winding ranges from three to twenty times diameter of the wire of the coil.

References Cited

UNITED STATES PATENTS

| | | | |
|---|---|---|---|
| 3,137,842 | 6/1964 | Wiegand | 340—174 |
| 3,223,987 | 12/1965 | Wiegand | 340—174 |
| 3,274,527 | 9/1966 | Robinson | 336—188 XR |

BERNARD KONICK, *Primary Examiner.*

G. M. HOFFMAN, *Assistant Examiner.*